United States Patent
Michioka et al.

[11] Patent Number: 6,155,717
[45] Date of Patent: Dec. 5, 2000

[54] LINEAR MOVEMENT DEVICE AND LUBRICANT SUPPLYING DEVICE USED THEREFOR

[75] Inventors: Hidekazu Michioka; Mitsuaki Honma, both of Tokyo, Japan

[73] Assignee: THK Co., Ltd., Tokyo, Japan

[21] Appl. No.: 09/091,354

[22] PCT Filed: Nov. 10, 1997

[86] PCT No.: PCT/JP97/04088

§ 371 Date: Jun. 18, 1998

§ 102(e) Date: Jun. 18, 1998

[87] PCT Pub. No.: WO98/21493

PCT Pub. Date: May 22, 1998

[30] Foreign Application Priority Data

Nov. 11, 1996 [JP] Japan .................................. 8-314250

[51] Int. Cl.[7] .............................. F16C 29/06; F16C 33/66
[52] U.S. Cl. ................................ 384/15; 384/13; 384/16; 384/45; 74/89.15
[58] Field of Search .................................. 384/13, 15, 16, 384/43, 44, 45; 74/89.15, 459, 424.8 R

[56] References Cited

U.S. PATENT DOCUMENTS

| | | |
|---|---|---|
| 5,399,023 | 3/1995 | Winkelmann et al. ............... 384/15 X |
| 5,492,413 | 2/1996 | Tsukada .................... 384/15 |
| 5,547,285 | 8/1996 | Hutzel et al. .............. 384/15 |
| 5,678,927 | 10/1997 | Yabe et al. .................. 384/15 |
| 5,694,811 | 12/1997 | Tsukada ................. 384/13 X |
| 5,749,266 | 5/1998 | Tsukada ............... 74/89.15 X |

FOREIGN PATENT DOCUMENTS

| | | |
|---|---|---|
| 61-99143 | 6/1986 | Japan . |
| 5-71443 | 9/1993 | Japan . |
| 6-307442 | 11/1994 | Japan . |
| 7-23824 | 5/1995 | Japan . |
| 8-247144 | 9/1996 | Japan . |
| 9-025933 | 1/1997 | Japan . |
| 9-152095 | 6/1997 | Japan . |

*Primary Examiner*—Thomas R. Hannon
*Attorney, Agent, or Firm*—Nikaido, Marmelstein, Murray & Oram LLP

[57] ABSTRACT

The present invention relates to a linear movement device, for example, a linear guide device, a ball screw, a ball spline or the like in which a track shaft and a slide member is engaged movably relative to each other via a rolling element of a ball, a roller or the like, in details, to an improvement of a linear movement device having a lubricant supplying member coating a lubricant on a face of the track shaft. The linear movement device is constituted by a track shaft where a rolling face of a rolling element is formed, a slide member engaged with the track shaft via the rolling element and moved relative to the track shaft and a lubricant supplying member mounted to the slide member and coating a lubricant on a surface of the track shaft in accordance with the relative movement and further, the lubricant supplying member includes a lubricant coater brought into contact with the track shaft for coating the lubricant on the track shaft, a lubricant absorber installed contiguous to the lubricant coater for supplying the lubricant to the lubricant coater while absorbing the lubricant and holding the lubricant and oil amount controlling means for controlling an amount of the lubricant supplied from the lubricant absorber to the lubricant coater.

10 Claims, 17 Drawing Sheets

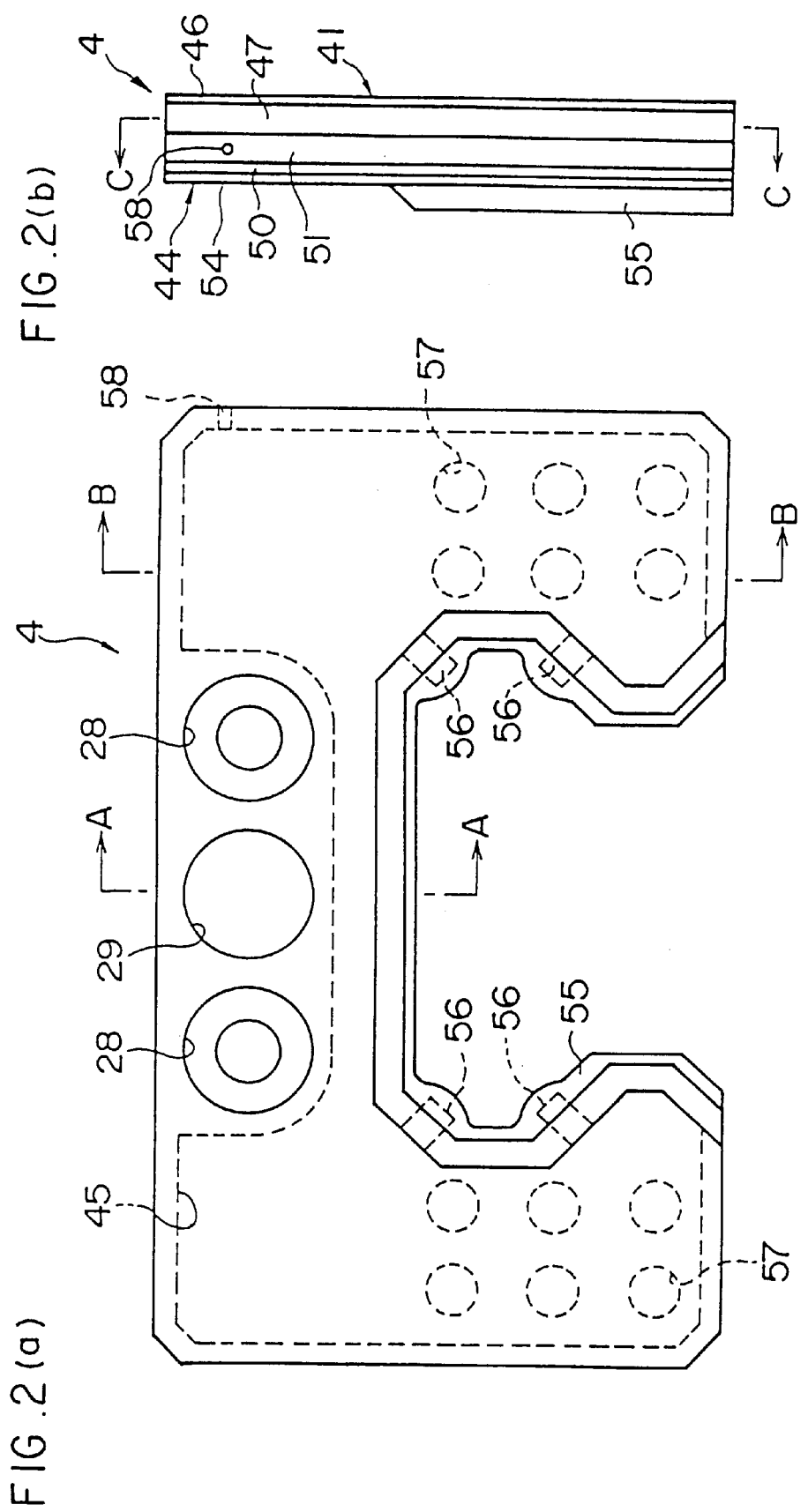

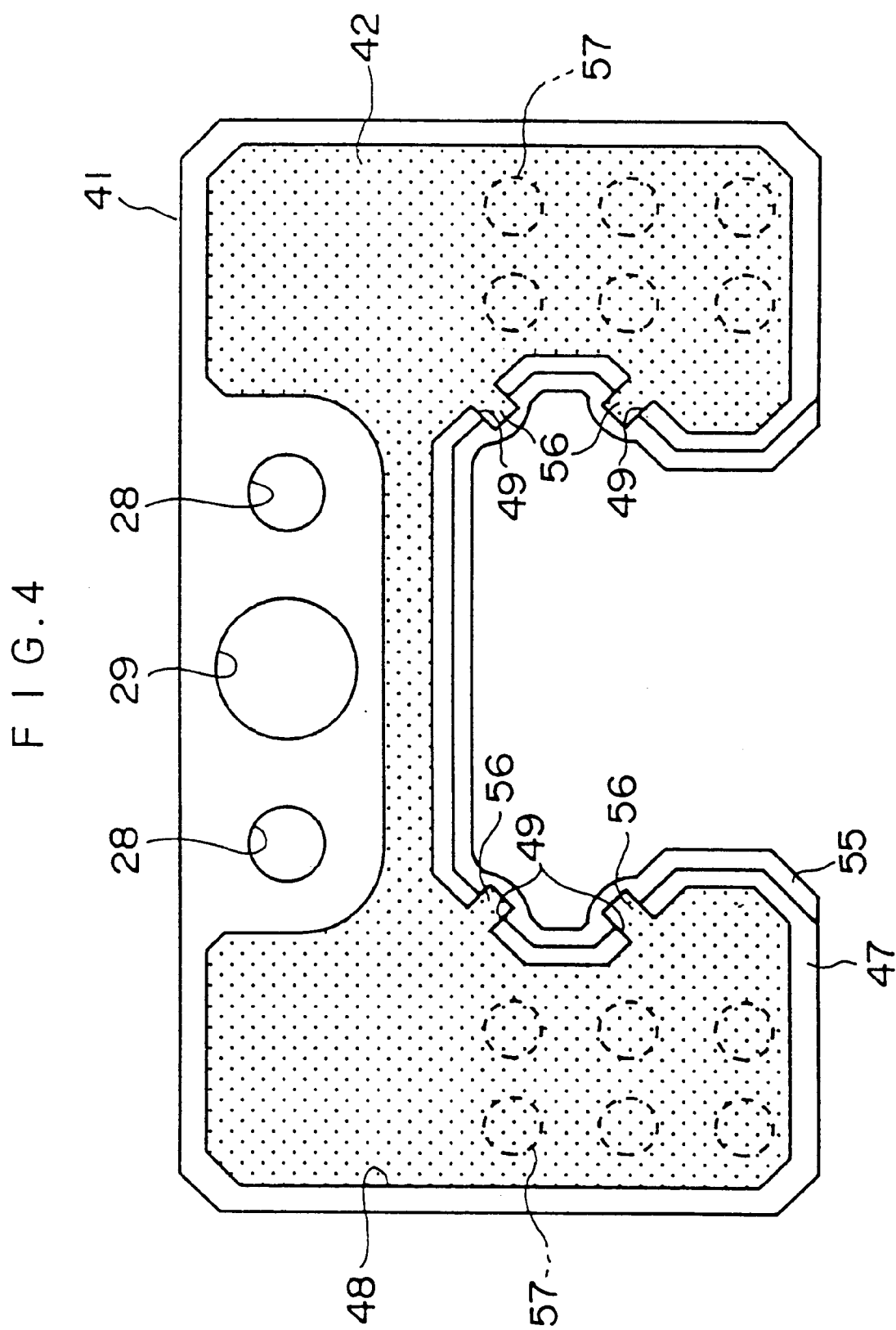

F I G. 9
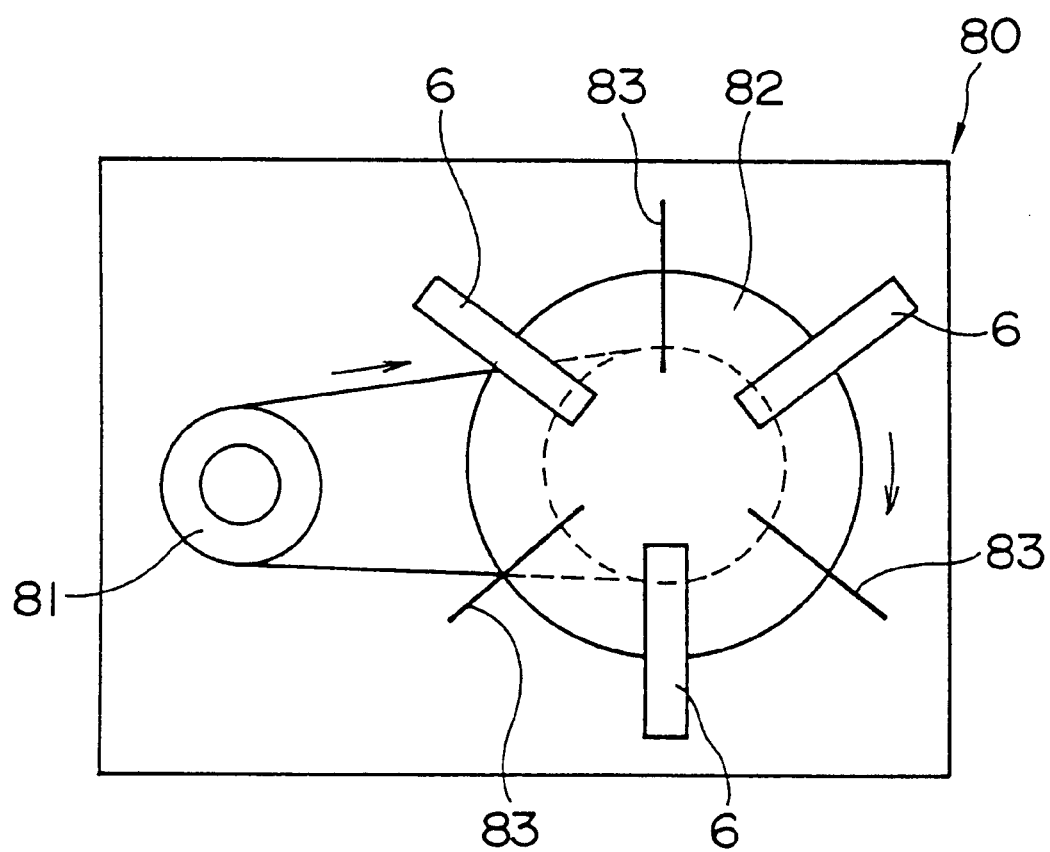

LINEAR MOVEMENT DEVICE AND LUBRICANT SUPPLYING DEVICE USED THEREFOR

TECHNICAL FIELD

The present invention relates to a linear movement device in which a track shaft and a slide member are engaged movably relative to each other via rolling elements of balls, rollers or the like as in, for example, a linear guide device, a ball screw, a ball spline or the like, in details, to an improvement of a linear movement device having a lubricant supplying device for coating a lubricant on a surface of the track shaft.

BACKGROUND ART

Conventionally, there has been known, as this kind of a linear movement device, a linear guide device used in a linear guide portion of a machine tool, a transferring device or the like for guiding a movable body of a table or the like on a fixed unit of a bed, a saddle or the like, a ball screw used along with the linear guide device for providing stroke of linear movement in accordance with a rotational amount of a motor to the movable body or the like.

The former linear guide device is constituted by a track rail (track shaft) arranged above the fixed unit and where a rolling groove of balls is formed in the longitudinal direction and a sliding base (slide member) having a load rolling groove opposed to the rolling groove of the track rail via a number of rolls and where an infinite circulation path of balls rolling on the load rolling groove is formed and is constituted such that the sliding base supporting the movable body is linearly moved continuously along the track rail in accordance with infinite circulation of the balls. Further, in contrast thereto, there is a case where it is constituted such that the track rail is moved relative to the fixed sliding base.

Meanwhile, the latter ball screw is constituted by a screw shaft (track shaft) where a ball rolling groove in a spiral shape is formed by a predetermined lead and a nut member (slide member) having a load rolling groove opposed to the ball rolling groove via a number of balls and where an infinite circulation path of the balls rolling on the load rolling groove is formed and is constituted such that the balls are circulated in the infinite circulation path in correspondence with relative rotational movement between the screw shaft and the nut member by which the nut member and the screw shaft are moved in the shaft direction relative to each other.

Meanwhile, in using such a linear movement device, the balls or the above-described rolling grooves and so on need to pertinently lubricate in accordance with conditions of use in view of restraining wear of the balls per se, wear of the rolling groove of the track rail or the screw shaft on which the balls roll or wear of the load rolling groove of the sliding base or the nut member and maintaining high precision movement of the slide member over a long period of time.

Conventionally, there has been known a linear guide device disclosed in Japanese Unexamined Utility Model Publication No. JP-A-7-23824 as a linear movement device having a device for supplying lubricant to balls, rolling grooves and so forth. According to the linear guide device, as shown in FIG. 19, polymer members 120 impregnating a lubricant are provided on an inner face of a sliding base 122 opposed to a track rail 121, the lubricant gradually oozing out from the polymer members 120 is coated on an upper face 123 and side faces 124 in accordance with reciprocating movement of the sliding base 122 by which the lubricant is supplied to rolling grooves 125 and balls 126.

Further, there has been known other lubricant supplying device for lubricating a track shaft of a linear movement device disclosed in Japanese Unexamined Patent Publication No. JP-A-6-307442. According to the lubricant supplying device, as shown in FIG. 20, pads 127 impregnating a lubricant are incorporated into cover frames 128 by which the pads 127 at inside thereof are brought into contact with a track rail 129 and the cover frames 128 are mounted at a front portion and a rear portion of a sliding base 130 in the movement direction such that the pads 127 are brought into sliding contact with the track rail 129 in accordance with the movement of the sliding base 130. Accordingly, when the sliding base 130 is reciprocated along the track rail 129, the lubricant oozed out from the pads 127 is coated on the surface of the track rail 129 and the lubricant is similarly supplied to rolling grooves or balls.

However, according to these lubricant supplying devices, the polymer member or the pad mounted to the sliding base is provided with both of a function as a coater for coating the lubricant on the track rail and a function as an absorber for holding the lubricant per se, a material which is optimum as the former of the coater is not necessarily a material which is optimum as the latter of the absorber and accordingly, it is difficult to stably supply the lubricant to the track rail over a long period of time.

That is, at an initial stage of start of use, the polymer member or the pad is sufficiently impregnated with the lubricant and accordingly, an amount of the lubricant excessive for lubricating the ball rolling grooves or the balls is coated on the track rail, whereas with an increase in an accumulated running distance of the sliding base in respect of the track rail, the amount of coating the lubricant to the track rail is significantly reduced and it is difficult to coat a necessary minimum amount of the lubricant for lubricating the ball rolling grooves and the balls stably on the track rail over a long period of time.

Meanwhile, although in order to coat a sufficient amount of the lubricant on the track rail over a long period of time, the polymer member or the pad may be magnified and a large amount of the lubricant may be held thereby, even when such a measure is adopted, the above-described problem in which the amount of supplying the lubricant is significantly changed in accordance with accumulation of the running distance of the sliding base cannot be resolved, or there also poses a problem in which the sliding base mounted with the polymer member or the pad is magnified and downsizing of a linear movement device cannot be achieved.

DISCLOSURE OF THE INVENTION

The present invention has been carried out in view of such a problem and it is an object of the present invention to provide a linear movement device capable of coating lubricant of an amount which is necessary minimum in lubricating a rolling groove of a rolling element or a rolling element stably over a long period of time and capable of achieving to downsize a slide member. Further, it is other object of the present invention to provide a lubricant supplying device preferable in a linear movement device such as a linear guide device, a ball screw device or the like.

In order to achieve the above-described object, there is provided a linear movement device including a track shaft where a rolling face of a rolling element is formed, a slide member engaged with the track shaft via the rolling element and moved relative to the track shaft and a lubricant supplying member mounted to the slide member and coating a lubricant on a surface of the track shaft in accordance with the relative movement as a premise wherein the lubricant supplying member includes a lubricant coater brought into contact with the track shaft for coating the lubricant on the track shaft, a lubricant absorber installed contiguous to the lubricant coater for supplying the lubricant to the lubricant coater while absorbing the lubricant and holding the lubricant and oil amount controlling means for controlling an amount of the lubricant supplied from the lubricant absorber to the lubricant coater.

According to such a technical means, coating of the lubricant on the track shaft is carried out by the lubricant supplying member mounted to the slide member, the lubricant supplying member includes the lubricant coater and the lubricant absorber and a function of coating the lubricant to the track shaft and a function of holding the lubricant are allotted to the lubricant coater and the lubricant absorber. Therefore, the lubricant of an amount in correspondence with an amount of supply from the lubricant absorber to the lubricant coater, is coated on the track shaft in this linear movement device.

Further, the lubricant supplying member is provided with the oil amount controlling means for controlling the amount of the lubricant supplied from the lubricant absorber to the lubricant coater and accordingly, the amount of supplying the lubricant from the former to the latter does not change significantly with elapse of time and a stable amount of the lubricant can always be impregnated to the lubricant coater.

In this way, according to the linear movement device of the present invention, even when an accumulated running distance of the slide member in respect of the track shaft is increased with elapse of time, the lubricant coater supplied with the lubricant from the lubricant absorber, impregnates always the stable amount of the lubricant and a constant amount of the lubricant can always be coated from the lubricant coater onto the track shaft.

In this case, while a material capable of coating the lubricant impregnated to the lubricant coater onto the track shaft with no stagnation, for example, felt made of polyester mixed with sheep wool, sintered resin or the like is preferable for the lubricant coater, a material capable of absorbing and holding a large amount of the lubricant, for example, felt made of polyester, sintered resin or the like is preferable for the lubricant absorber.

Further, in mounting the lubricant supplying member onto the slide member, the lubricant coater and the lubricant absorber may be directly mounted onto the slide member in an exposed state or the lubricant coater and the lubricant absorber may be incorporated in a casing and a casing may be mounted onto the slide member. For example, when the lubricant coater and the lubricant absorber are fabricated by sintered resin, they can be molded into desired shapes comparatively easily and can be fixed directly to the slide member by screwing.

Further, in incorporating the lubricant coater and the lubricant absorber in the casing, these may be incorporated separate casings respectively and two casings may be connected to constitute the lubricant supplying member.

Further, the oil amount controlling means may be of any constitution so far as the amount of supplying the lubricant from the lubricant absorber to the lubricant coater is restricted. For example, by using respectively different materials for forming the lubricant absorber and the lubricant coater, the movement of the lubricant from the former to the latter can be restricted to some degree and the lubricant which is held in the lubricant absorber in a large amount can be supplied to the lubricant coater by a constant amount.

As other oil amount controlling means, an oil amount adjusting film for permeating the lubricant may be installed between the lubricant absorber and the lubricant coater and only the lubricant which has permeated the oil amount adjusting film may be supplied from the lubricant absorber to the lubricant coater. As such an oil amount adjusting film, for example, paper through which the lubricant is permeable may be used and laminating operation may be performed by polyethylene or the like on the surface of the paper to adjust an area through which the lubricant permeate. According to such a constitution, by selecting material, thickness or the like of the oil amount adjusting film, an amount of the lubricant supplied from the lubricant absorber to the lubricant coater per unit time can be controlled and the amount of the lubricant coated from the lubricant coater onto the track shaft can be stabilized over a long period of time.

However, although in providing the oil amount adjusting film between the lubricant absorber and the lubricant coater, an intermediary between a peripheral edge of the oil amount adjusting film and the casing needs to hermetically seal completely by a caulking compound or the like to prevent the lubricant from leaking from the intermediary, the operation of hermetically sealing the surrounding is not easy since the oil amount adjusting film is as soft as paper or the like. Accordingly, from such a view point, it is preferable to constitute the oil amount controlling means by a thin stainless steel sheet or the like separating the lubricant absorber and the lubricant coater and open a supply hole for supplying the lubricant in the oil amount adjusting plate.

Further, according to the oil amount adjusting plate, by adjusting an inner diameter or a number of the supply holes opened in the plate, the amount of the lubricant supplied from the lubricant absorber to the lubricant coater per unit time can be controlled and the amount of the lubricant coated onto the track shaft by the lubricant coater can be adjusted.

Meanwhile, in view of the inherent object of lubricating the rolling face of the rolling element or the rolling element per se, the lubricant coater needs not to coat the lubricant on all the peripheral faces of the track shaft and the lubricant may be coated only on the rolling faces of the rolling elements.

Further, according to this kind of a linear movement device, it is general to hermetically seal a clearance between the track shaft and the slide member by mounting a seal member onto the slide member in order to prevent dust or the like adhered to the track shaft from entering the clearance between the track shaft and the slide member. According to the linear movement device of the present invention, although a seal member may be provided separately from the lubricant supplying member and the seal member may be mounted to the slide member or the lubricant supplying member, according to such a constitution, a number of parts mounted to the slide member is increased and assembling operation thereof is complicated. Hence, in order to construct a more simple constitution, it is preferable to install a seal grip portion which is brought into close contact with the surface of the track shaft at the casing of the lubricant supplying member such that the lubricant supplying member is provided with also a function as a seal member.

Further, when the seal grip portion is provided with the casing of the lubricant supplying member, it is preferable that the casing is formed by a soft elastic body of rubber of the like and the seal grip portion and the casing are integrally molded by injection molding or the like. In addition thereto, when the casing of the lubricant supplying member is formed by a soft elastic body, by piercing an injection needle into the casing, the lubricant can also be replenished easily to the lubricant absorber in the casing.

Incidentally, the linear movement device according to the present invention is a concept including not only the linear guide device mentioned above and the ball screw, but also a ball spline in which a nut member in a cylindrical shape is fitted to a spline shaft where ball rolling grooves are formed along the axial direction.

Meanwhile, according to another aspect of the present invention, there is provided a lubricant supplying device mounted to a slide member engaged with a track shaft via a rolling element for coating a lubricant to the track shaft in accordance with a relative movement between the slide member and the track shaft wherein the lubricant supplying device includes a lubricant coater brought into contact with the track shaft for coating the lubricant to the track shaft, a lubricant absorber installed contiguous to the lubricant coater for supplying the lubricant to the lubricant coater while absorbing the lubricant and holding the lubricant and oil amount controlling means for controlling an amount of the lubricant supplied from the lubricant absorber to the lubricant coater.

Further, also in the lubricant supplying device, the lubricant coater and the lubricant absorber may be mounted directly to the slide member in an exposed state, or the lubricant coater and the lubricant absorber may be incorporated in a casing and the casing may be mounted to the slide member.

BRIEF DESCRIPTION OF DRAWINGS

FIGS. 2(a) and 2(b) are a front view and a side view showing a lubricant supplying member according to the first embodiment.

FIG. 4 is a sectional view taken along a line C—C of FIG. 2.

FIG. 9 is a plane view showing an outline of a tester for testing function of the lubricant supplying member according to the second embodiment.

Explanations of Notations

1—Track rail (track shaft), 2—Sliding base (sliding member), 3—Ball (rolling element), 4—Lubricant supplying member, 41—First casing (casing), 42—Lubricant coater, 43—Lubricant absorber, 44—Second casing (casing), 45—Oil amount adjusting plate (oil amount controlling means)

BEST MODE FOR CARRYING OUT THE INVENTION

A detailed explanation will be given of a linear movement device according to the present invention in reference to the attached drawings as follows.

Figure 1:
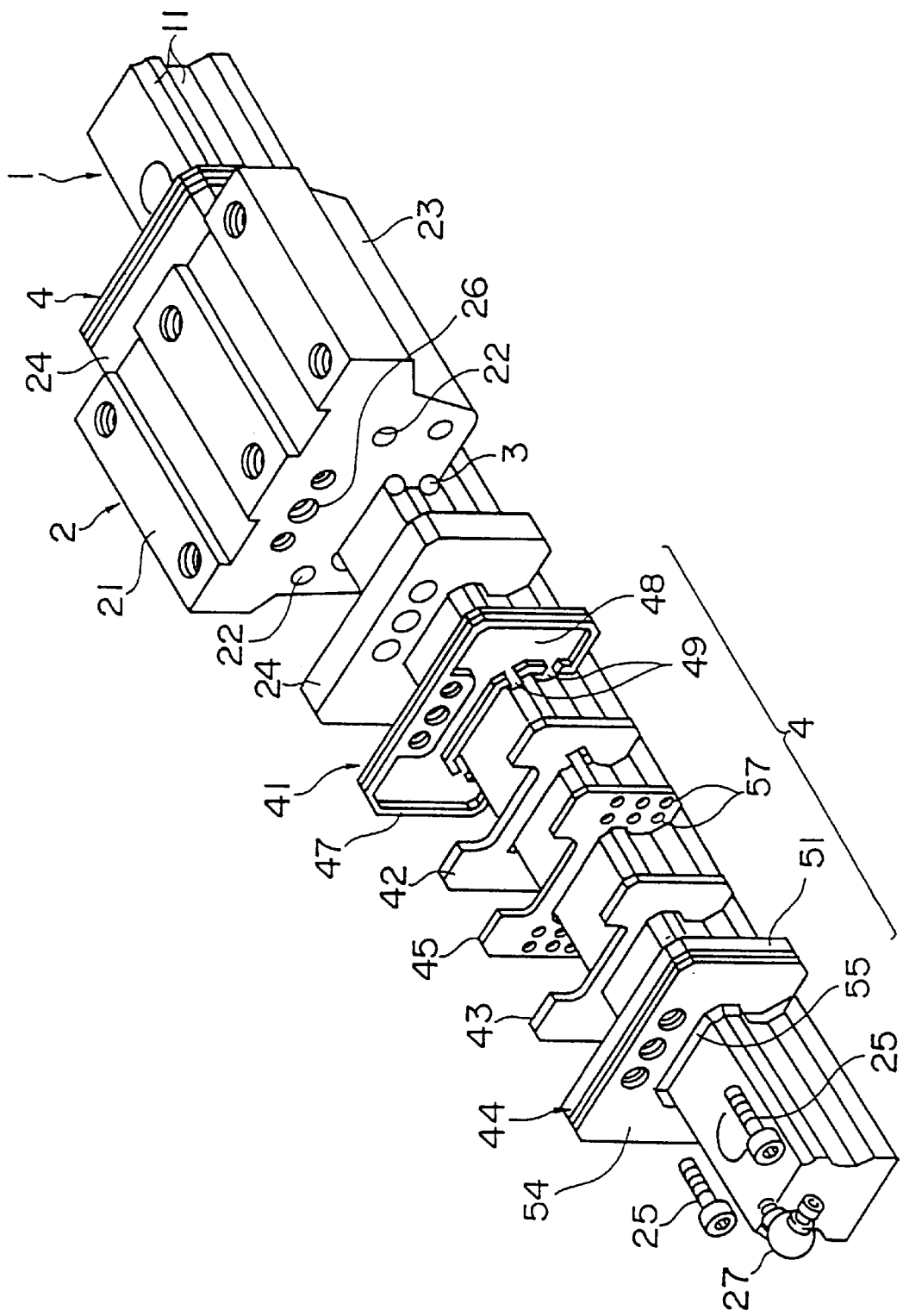
FIG. 1 is a disassembled perspective view showing a first embodiment in which the present invention is applied to a linear guide device.

FIG. 1 is a disassembled perspective view showing a first embodiment in which the present invention is applied to a linear guide device. The linear guide device according to the embodiment is constituted by a track rail (track shaft) 1 where rolling faces 11 for balls are formed along the longitudinal direction, a sliding base (sliding member) 2 fitted to the track rail via a number of balls 3 which are rolling elements and installed with infinite circulation paths of the balls at inside thereof and a pair of lubricant supplying members 4 for coating a lubricant on the surface of the track rail 1 in accordance with movement of the sliding base 2 which are mounted at both front and rear end faces in the direction of moving the sliding base 2 and is constituted such that the sliding base 2 is reciprocated on the track rail 1 in accordance with circulation of the balls 3.

Further, the sliding base 2 is constituted by a block main body 23 substantially in a saddle-like shape having a face 21 for attaching a machine device of a table or the like and having ball return holes 22 for circulating the balls 3 and a pair of end plates 24 fixed to the both front and rear faces of the block main body 23. The end plates 24 are formed with direction change paths (not illustrated) for scooping up the balls 3 from the ball rolling faces 11 of the track rail 1 and transferring the balls to the ball return holes 22 of the block main body 23 and on the other hand, transferring the balls 3 from the ball return holes 22 to the ball rolling faces 11 and by fixing the end plates 24 to the block main body 23 by using attaching bolts 25, infinite circulation paths of the balls 3 are formed in the sliding base 2.

Further, oil supply ports 26 for supplying a lubricant to the infinite circulation paths are installed to the block main body 23 and the oil supply ports are mounted with supply nipples 27 via the lubricant supplying members 4 and the end plates 24.

Meanwhile, the lubricant supplying member 4 is constituted by a first casing 41 which is brought into contact with the end plate 24, a lubricant coater 42 which is incorporated in the first casing 41 and is brought into contact with the track rail 1 for coating the lubricant to the track rail 1, a lubricant absorber 43 which absorbs and holds the lubricant and supplies the lubricant to the lubricant coater 42, a second casing 44 for incorporating the lubricant absorber 43, and an oil amount adjusting plate (oil amount controlling means) 45 for separating the lubricant coater 42 and the lubricant absorber 43 when the first casing 41 and the second casing 44 are bonded with each other.

Figure 3A:
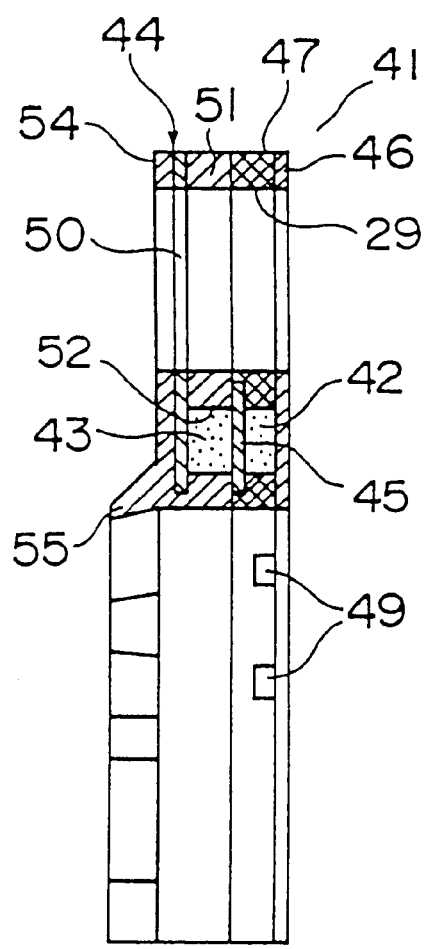
FIG. 3(a) is a sectional view taken along a line A—A of FIG. 2
Figure 3B:
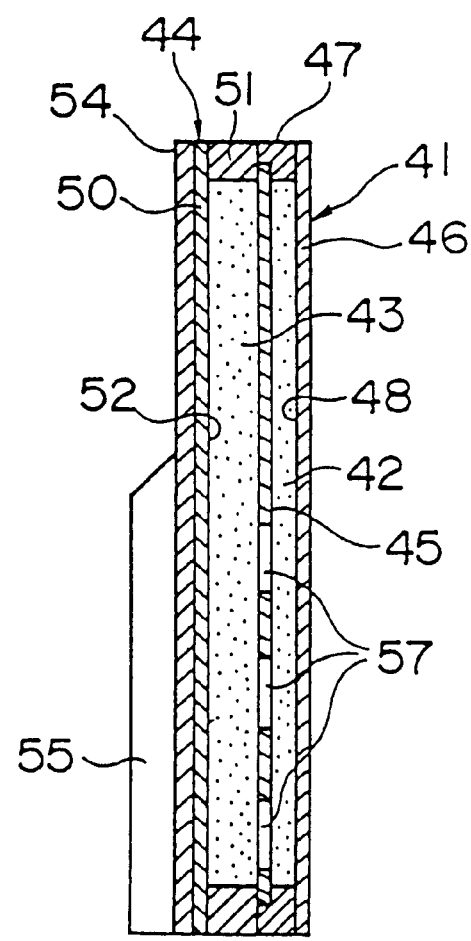
FIG. 3(b) is a sectional view taken along a line B—B of FIG. 2.

As shown in FIG. 2 through FIG. 4, the first casing 41 is projected with a strip-like projection 47 along a contour of a steel plate for constituting a base plate 46 and a recess portion 48 surrounded by the strip-like projection 47 constitutes a space for incorporating the lubricant coater 42. Further, openings 49 are formed in the strip-like projection 47 at positions opposed to the rolling faces 11 of the track rail 1 and portions of the lubricant coater 42 are projected from the openings 49. Here, the strip-like projection 47 is molded by a rubber material which is a soft elastic body and is bonded to the base plate 46 by vulcanization bonding. The recess portion 48 is formed to evade through holes 28 and 29 for the attaching bolts 25 and the supply nipple 27 and a substantially H-like shape is constituted as a whole as shown in FIG. 4.

Further, the second casing 43 is also projected with a strip-like projection 51 along the contour of a steel plate constituting a base plate 50 and a recess portion 52 surrounded by the strip-like projection 51 constitutes a space for incorporating the lubricant absorber 43. The strip-like projection 51 is also molded by a rubber material which is a soft elastic body and is projected from a face of the substrate 50 on the side of the first casing 41 to be brought into contact with the strip-like projection 47 of the first casing 41. Further, a face of the substrate 50 on the opposite side is covered with a protective layer 54 comprising a rubber member and the protective layer 54 is projected with a seal lip portion 55 that is brought into close contact with the side faces and the upper face of the track rail 1. Further, the recess portion 52 of the second casing 43 is formed also to evade the through holes 28 and 29 for the attaching bolts 25 and the supply nipple 27 and a substantially H-like shape is constituted as a whole.

Further, the lubricant coater 42 is molded in a substantially H-like shape the same as that of the recess portion 48 of the first casing 41 and projection pieces 56 which are brought into contact with the rolling faces 11 of the track rail 1 are projected in conformity with positions of the openings 49 formed in the strip-like projection 47. An entangled body of fiber having a material which is liable to cause movement of the lubricant by capillary phenomenon, that is, felt or the like having a low percentage of void, is suitable for the lubricant coater 42 such that the impregnated lubricant can be coated on the track rail 1 with no stagnation and in this embodiment, sheep wool felt having a percentage of void of 54% is used.

Further, the lubricant absorber 43 is molded in a substantially H-like shape the same as that of the recess portion 52 of the second casing 44 and an entangled body of fiber such as felt or the like having a high percentage of void is suitable therefor such that a large amount of the lubricant can be absorbed and held. In this embodiment, sheep wool felt mixed with rayon having a percentage of void of 81% is used.

Meanwhile, the oil amount adjusting plate 45 is constituted to be sandwiched between the lubricant coater 42 and the lubricant absorber 43 to separate them when the strip-like projection 47 of the first casing 41 and the strip-like projection 51 of the second casing 44 are bonded together and in this embodiment, a thin stainless steel sheet having a thickness of 0.1 through 0.2 mm is used. Further, the oil amount adjusting plate 45 is opened with a plurality of supply holes 57 and is constituted such that the lubricant impregnated in the lubricant absorber 43 is moved to the lubricant coater 42 via the supply holes 57. Further, in order to prevent the lubricant from leaking from the lubricant absorber 43 to the lubricant coater 42 via the peripheral edge of the oil amount adjusting plate 45, a stepped portion is formed in the strip-like projection 47 of the first casing 41 for fitting the peripheral edge of the oil amount adjusting plate 45 and when the strip-like projection 47 of the first casing 41 and the strip-like projection 51 of the second casing 44 are bonded together, the peripheral edge of the oil amount adjusting plate 45 is sealed by being sandwiched by the strip-like projections 47 and 51.

Further, in order to smoothly supply the lubricant from the lubricant absorber 43 to the lubricant coater 42, as shown in FIG. 2, a vent hole 58 is opened in the strip-like projection 51 of the second casing 44 by which pressures in the first casing 41 and the second casing 44 are maintained always at the atmospheric pressure. Accordingly, the movement of the lubricant from the lubricant absorber 43 to the lubricant coater 42 is mainly dependent upon the capillary phenomenon of the lubricant at inside of the entangled bodies of fiber. However, the lubricant disposed upward from the supply holes 57 of the oil amount adjusting plate 45 in the lubricant impregnated in the lubricant absorber 43, is moved to the side of the lubricant coater 42 also by gravity.

According to the lubricant supplying member 4 constituted as mentioned above, firstly, the lubricant is previously impregnated sufficiently to the lubricant coater 42 and the lubricant absorber 43, thereafter, the lubricant coater 42 is incorporated into the first casing 41, the lubricant absorber 43 is incorporated to the second casing 44 and the both casings 41 and 44 are bonded together by vulcanization bonding to sandwich the oil amount adjusting plate 45. Thereby, integration of the lubricant supplying member 4 in which the lubricant absorber 43 and the lubricant coater 42 are incorporated is completed. Further, the lubricant supplying members 4 are mounted to both of the front and the rear end faces of the sliding base 2 by the attaching bolts 25.

In a state where the lubricant supplying members 4 are attached to the sliding base 2, the projection pieces 56 of the lubricant coater 42 projected from the first casing 41 are brought into press contact with the ball rolling faces 11 of the track rail 1 and when the sliding base 2 is moved on the track rail 1, the lubricant is coated from the projection pieces 56 to the ball rolling faces 11. Further, the seal lip portions 55 projected from the second casing 44 is brought into sliding contact with the upper face and the side faces of the track rail 1 and prevent dust adhered to the track rail 1 from invading a clearance between the track rail 1 and the sliding base 2.

When the lubricant is coated from the projection pieces 56 of the lubricant coater 42 onto the track rail 1 in this way, the lubricant impregnated in the lubricant coater 42 is moved to the projection pieces 56 by the capillary phenomenon. Meanwhile, a large amount of the lubricant is held in the lubricant absorber 43 and therefore, when the lubricant impregnated to the lubricant coater 42 is gradually reduced, the lubricant impregnated in the lubricant absorber 43 is supplied to the lubricant coater 42 via the supply holes 57 of the oil amount adjusting plate 45 similarly by the capillary phenomenon.

In this way, a substantially constant amount of the lubricant is always impregnated in the lubricant coater 42 and stabilization of amount of the lubricant coated from the lubricant coater 42 onto the track rail 1 can be achieved. Further, the amount of the lubricant coated from the lubricant coater 42 onto the track rail 1 can arbitrarily be adjusted by changing a contact area between the projection pieces 56 and the ball rolling faces 11 of the track rail 1 or changing the percentage of void of the fiber entangled body constituting the lubricant coater 42.

Meanwhile, according to the embodiment, the amount of the lubricant coated from the lubricant coater 42 onto the ball rolling faces 11 of the track rail 1 can be adjusted by changing the number or the inner diameter of the supply holes 57 opened in the oil amount adjusting plate 45. The reason is that when the inner diameter or the number of the supply holes 57 opened in the oil amount adjusting plate 45 is changed, the contact area in respect with the lubricant absorber 43 and the lubricant coater 42 is changed and therefore, the amount of the lubricant supplied from the lubricant absorber 43 to the lubricant coater 42 per unit time is changed and the amount of the lubricant impregnated in the lubricant coater 42 is increased or decreased. Accordingly, in the linear movement device of the embodiment, an amount of the lubricant optimum to object of use can be coated onto the track rail 1 by adjusting the inner diameter and/or the number of the supply holes 57 opened in the oil amount adjusting plate 45 in accordance with different use or the like.

Further, in the case where a time period of use has elapsed to some degree and almost all of the lubricant impregnated in the lubricant absorber 43 has been consumed, the lubricant needs to replenish from outside to the lubricant absorber 43 and in such a case, the lubricant can be supplied to the lubricant absorber 43 in the second casing 44 via the vent hole 58 installed to the second casing 44. Further, the strip-like projection 51 of the second casing 44 is molded by rubber material and therefore, by piercing an injection needle directly to the strip-like projection 51, the lubricant can also be replenished easily to the lubricant absorber 43.

Figure 5:
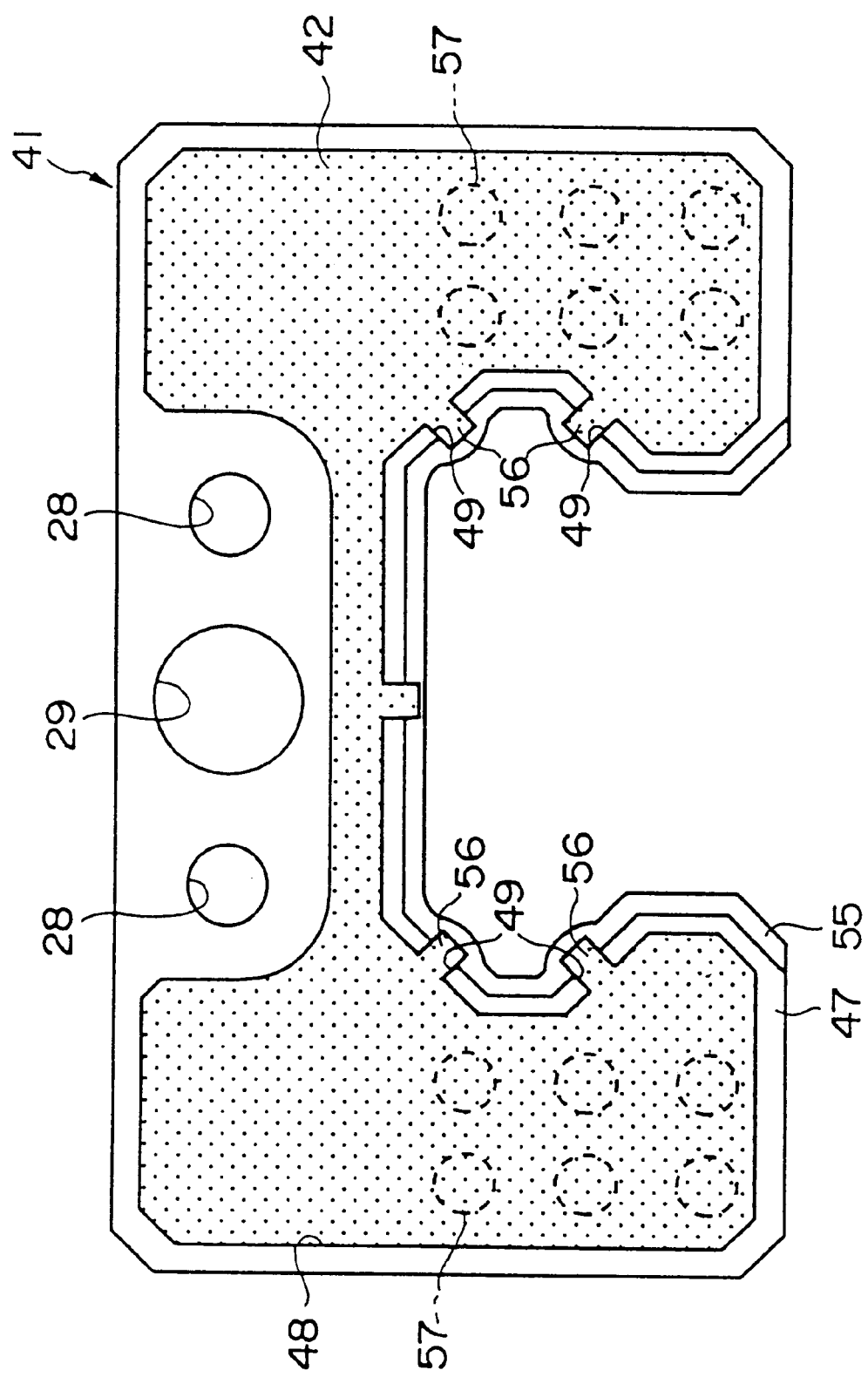
FIG. 5 is a sectional view showing an example in which the lubricant supplying member according to the first embodiment is modified such that a lubricant can be coated also on an upper face of a track rail.

Further, according to the lubricant supplying member 4 of the embodiment, the lubricant coater 42 is constituted to coat the lubricant only to ball rolling grooves 11 of the track rail 1, however, in such a constitution, the lubricant is difficult to adhere onto the upper face of the track rail 1 and therefore, when the sliding base 2 is moved on the track rail 1 at high speed, there is a concern that the seal lip portions 55 which are brought into abrasive contact with the track rail 1 may be destructed. Therefore, from such a point of view, as shown in FIG. 5, it is preferable to form the projection piece 56 of the lubricant coater 42 also at a position in correspondence with the upper face of the track rail 1 and to coat the lubricant from the projection piece 56 onto the upper face of the track rail 1.

Figure 6B:
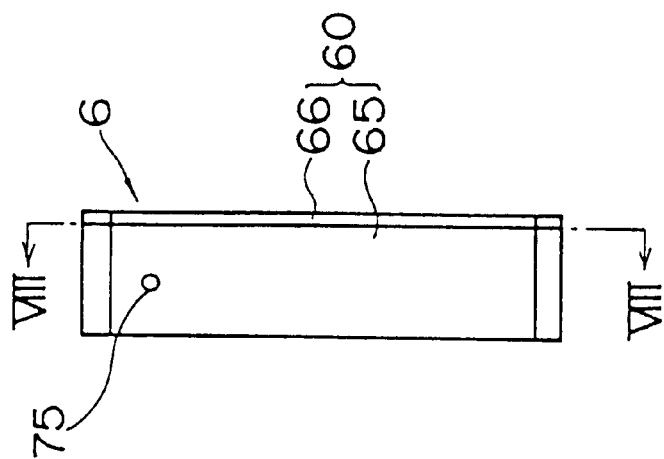
FIGS. 6(a) and 6(b) illustrate a front view and a side view showing a second embodiment of a lubricant supplying member.
Figure 6A:
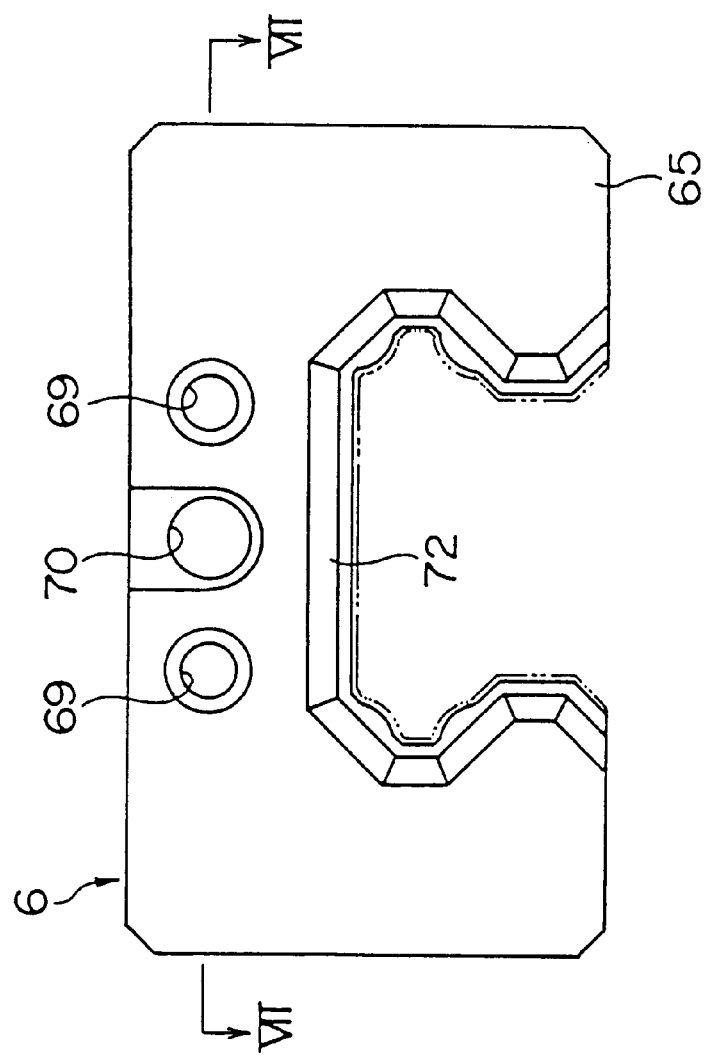
Figure 7:
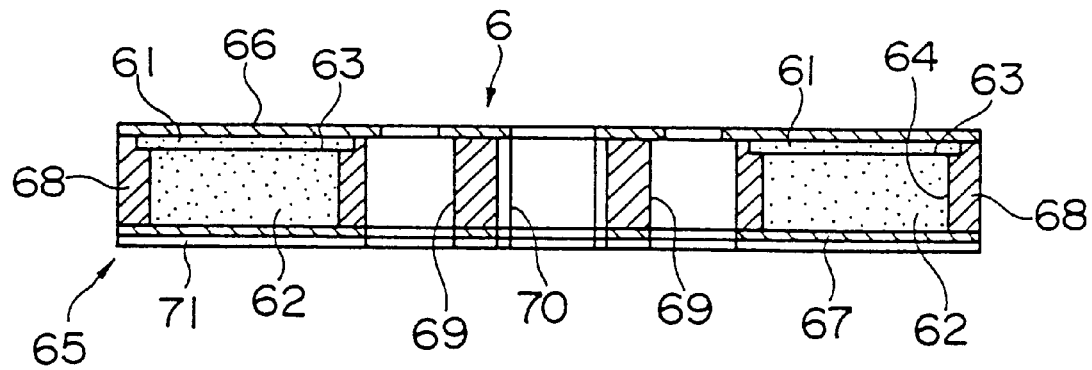
FIG. 7 is a sectional view taken along a line VII—VII of FIG. 6.
Figure 8:
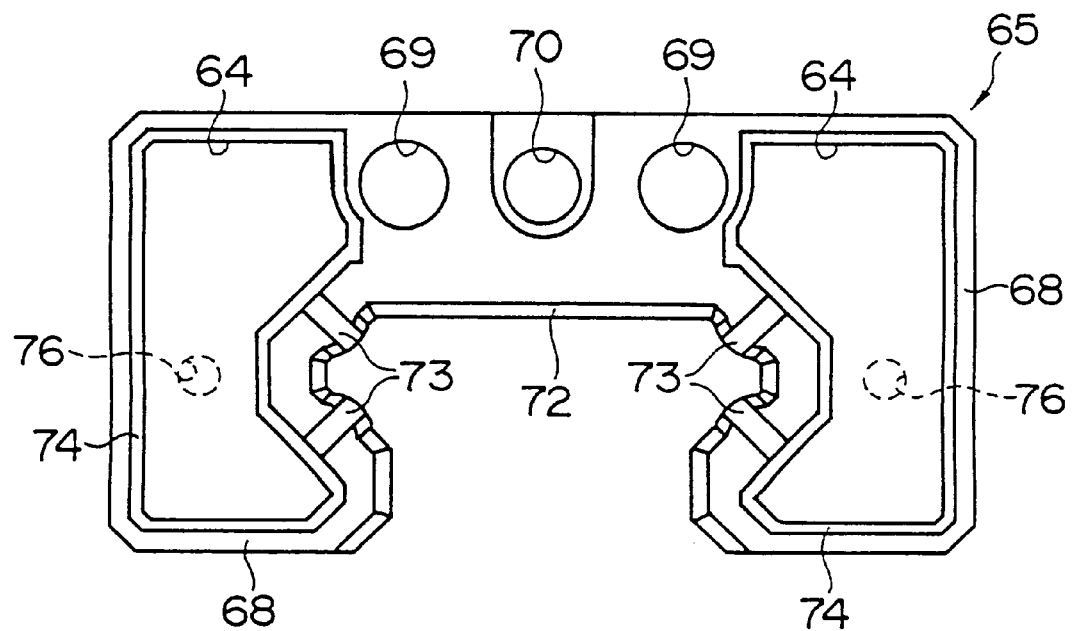
FIG. 8 is a sectional view taken along a line VIII—VIII of FIG. 6.

FIG. 6 through FIG. 8 show a second embodiment of a lubricant supplying member.

A lubricant supplying member 6 of the second embodiment is constituted by a casing 60 which is mounted to the end plate 24 of the sliding base 2, a lubricant coater 61 and a lubricant absorber 62 both incorporated in the casing 60, and an oil amount adjusting plate (oil amount controlling means) 63 which separates the lubricant coater 61 from the lubricant absorber 62.

The casing 60 is constituted by a casing main body 65 having a recess portion 64 for constituting a space for accommodating the lubricant absorber 62 and the lubricant coater 61 and a lid base plate 66 for hermetically closing the recess portion 64 of the casing main body 65 and when the casing 60 is mounted to the end plate 24 of the sliding base 2, the lid base plate 66 is brought into contact with the end plate 24.

FIG. 8 shows the casing main body 65. According to the casing main body 65, a side wall 68 made of rubber is erected along the contour of a steel plate constituting a base plate 67 and the recess portion 64 surrounded by the side wall 68 constitutes a space for accommodating the lubricant coater 61 and the lubricant absorber 62. The recess portion 64 is formed to evade through holes 69 and 70 for the attaching bolts 25 and the supply nipple 27 and two of the recess portions 64 in correspondence with both of the left and right side faces of the track rail 1 are installed independently from each other and the lubricant coater 61 and the lubricant absorber 62 for lubricating the left side face of the track rail 1 and those for lubricating the right side face are incorporated in the two recess portions 64 independently from each other. Further, a face of the base plate 67 on the side opposed to the side wall 68 is covered by a protective layer 71 comprising rubber material and as shown in FIG. 6, the seal lip portion 72 which is brought into close contact with the side faces and the upper face of the track rail 1 is projected from the protective layer 71.

Meanwhile, the side wall 68 is formed with recess grooves 73 at positions opposed to the rolling faces 11 of the track rail 1 and portions of the lubricant coater 61 incorporated in the recess portion 64 are projected from the recess grooves 73. Further, a stepped portion 74 is formed at the side wall 68 along the inner peripheral edge of the recess portion 64 and the oil amount adjusting plate 63 is fitted to the stepped portion 74 by which the lubricant coater 61 and the lubricant absorber 62 are separated from each other. Further, a vent hole 75 is formed in the side wall 68 also in this embodiment and smooth movement of the lubricant from the lubricant absorber 62 to the lubricant coater 61 is achieved.

Similar to the first embodiment, the oil amount adjusting plate 63 is formed by a thin stainless steel sheet and only a single hole of a supply hole 76 for supplying the lubricant impregnated to the lubricant absorber 62 to the lubricant coater 61 is opened. Although the shape of the supply hole 76 is circular in this embodiment, other shape may be adopted. The positions of opening the supply holes 76 are disposed at positions designated by broken lines in FIG. 8 and positions constituting substantially even distances to two streaks of the ball rolling faces 11 to which the lubricant is supplied from the respective lubricant coaters 61.

Further, according to the lubricant supplying member 6 constituted in this way, firstly, the side walls 68 and the protective layer 71 are bonded to the base plate 67 by vulcanization bonding to thereby fabricate the casing main body 65, the lubricant absorber 62 impregnating with the lubricant is incorporated in the recess portion 64 of the casing main body 65 and thereafter, the oil amount adjusting plates 63 are fitted to the stepped portions 74 of the side walls 68 of the casing main body 65 to cover the lubricant absorbers 62. Next, the lubricant coaters 61 are made to overlap the oil amount adjusting plates 63 and finally, the lid base plate 66 is bonded to the side walls 68 of the casing main body 65 by vulcanization bonding. In this way, the lubricant supplying member 6 incorporating the lubricant coater 61 and the lubricant absorber 62 at inside thereof is completed.

The lubricant supplying member 6 of the second embodiment constituted in this way is mounted to both of the front and rear end faces of the sliding base 2 of the linear guide device similar to the supplying member 4 of the first embodiment and the lubricant is coated from the lubricant coaters 61 onto the ball rolling faces 11 of the track rail 1 in accordance with movement of the sliding base 2.

In order to confirm whether the lubricant can stably be coated on the ball rolling faces 11 of the track rail 1 by the lubricant supplying member 6 of the second embodiment, the inventors have measured an amount of the lubricant actually delivered from the lubricant supplying member 6 by using a tester 80 shown in FIG. 9. According to the tester, a rotating circular disk 82 rotated by a motor 81 is assumed to represent the track rail 1, three pieces of the lubricant supplying members 6 are arranged at the surrounding of the rotating circular disk 82 and the lubricant is coated from the lubricant coaters 61 of the lubricant supplying members 6 onto the rotating circular disk 82. In this case, a speed of moving the rotating circular disk 82 relative to the lubricant supplying member 6 is set to 300 m/min. Further, in view of maintaining the viscosity of the lubricant constant, temperature of each of the lubricant supplying members 6 is monitored by a thermocouple and temperature of the lubricant occluded in the lubricant supplying member 6 is maintained at 25° C. Further, scrapers 83 are arranged among the lubricant supplying members 6 contiguous to each other such that coating condition of the lubricant on the rotating circular disk 82 is always made uniform and the lubricant coated from the lubricant supplying members 6 onto the rotating circular disk 82 is scraped off.

According to the test, the delivery amount of the lubricant from the lubricant supplying member 6 is calculated as follows. First, the weight of the lubricant supplying member 6 before supplying the lubricant is measured by an electronic balance, thereafter, the lubricant is injected into the lubricant absorber 62 incorporated in the lubricant supplying member 6 and the weight of the lubricant supplying member 6 is measured again by the electronic balance. Thereby, the weight of the supplied lubricant is grasped. Next, the lubricant supplying members 6 are set to the tester, the lubricant supplying members 6 are made to run by a predetermined distance by rotating the rotating circular disk 82 and thereafter, the weight of the lubricant supplying member 6 is measured by the electronic balance by which a total amount of the lubricant delivered during the rotation of the rotating circular disk 82 is calculated.

Figure 10A:
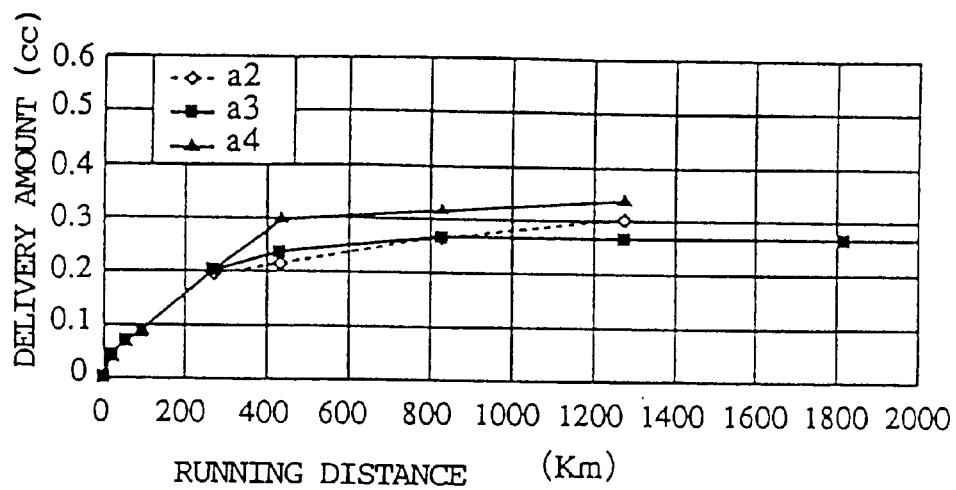
FIGS. 10(a)–10(c) are graphs showing a result of testing differences in delivery amounts of a lubricant coated on a track rail when a number of supply holes perforated in an oil amount adjusting plate is changed.
Figure 10B:
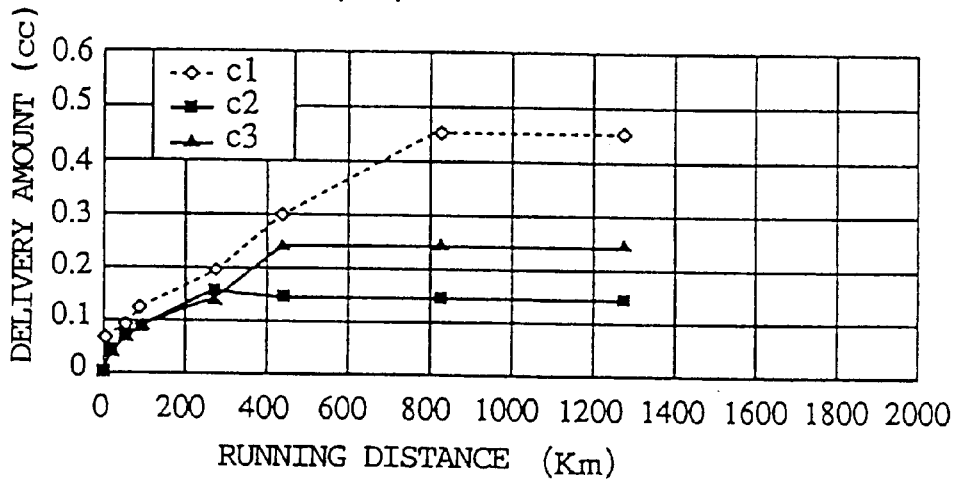
Figure 10C:
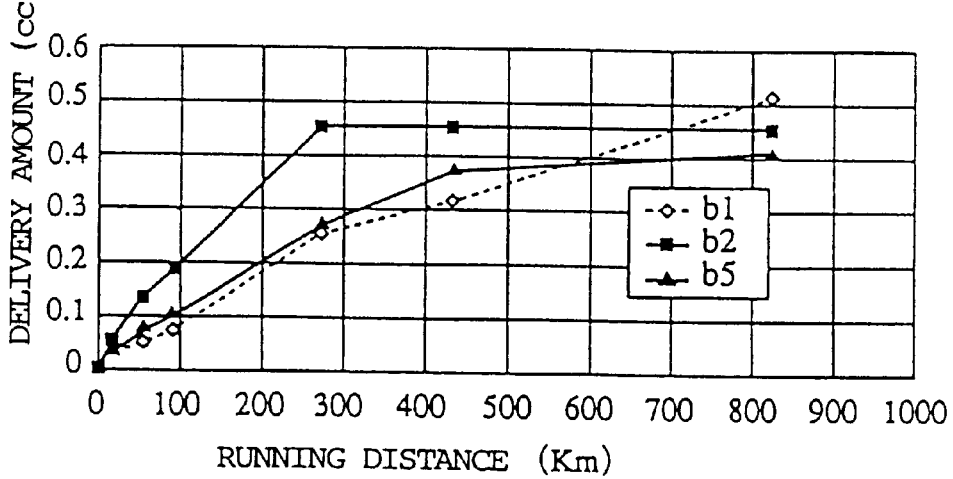

First, the applicant has carried out a test of confirming the delivery amount of the lubricant in respect of each of cases where the number of the supply hole having a diameter of 1 mm is 1, where it is 3 and where it is 6 in order to confirm whether the delivery amount of the lubricant in respect of the ball rolling face 11 of the track rail 1 differs in accordance with the number of the supply holes 76 opened in the oil amount adjusting plate 63. Further, the test has been carried out by preparing 3 of test pieces in respect of each of the numbers of the supply holes 76. FIG. 10(a) shows a result when the number of supply hole is 1, FIG. 10(b) shows that in the case of 2 of the supply holes and FIG. 10(c) shows a case of 3 of the supply holes.

As is apparent from these graphs, it is confirmed that even in cases of different numbers of the supply holes 76 opened in the oil amount adjusting plate 63, after running a certain degree of distance, the inclinations of the graphs are reduced, and an extremely small amount of the lubricant is stably supplied from the lubricant supplying member 6 to the rotating circular disk 82. However, it has been found that although when the number of the supply hole 76 opened in the oil amount adjusting plate 63 is 1, substantially the same amount of the lubricant is delivered in each of the three test pieces, when the number of the supply holes 76 is plural, there is a tendency in which a dispersion in the delivery amount of the lubricant is significant in respect of the three test pieces and when the test piece is changed, the delivery amount of the lubricant differs significantly. Therefore, it is preferable in view of achieving stabilization of the amount of coating the lubricant onto the track rail 1 for each of the lubricant supplying members 6 to set the number of the supply hole 76 opened in the oil amount adjusting plate 63 to 1 for each of the lubricant coater 61.

Figure 11:
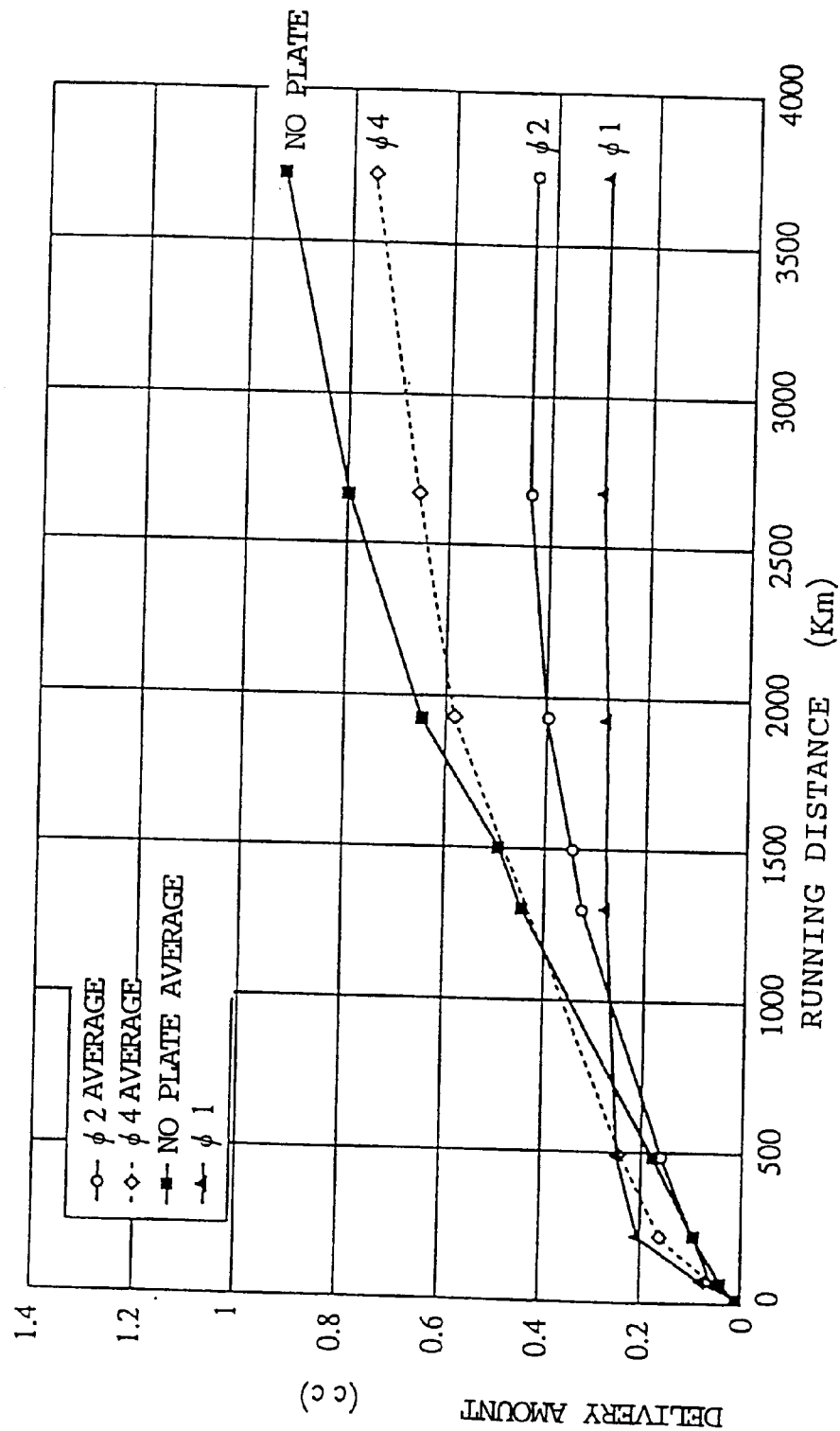
FIG. 11 illustrates graphs showing a result of testing a difference in delivery amounts of a lubricant coated on a track rail when an inner diameter of a supply hole perforated in an oil amount adjusting plate is changed.

Next, the applicant has carried out a test of confirming the delivery amount of the lubricant in respect of 4 kinds of cases where the inner diameter of the supply hole 76 is 1 mm, where it is 2 mm, where it is 4 mm and further, where the oil amount adjusting plate 63 is not installed in order to confirm whether the delivery amount of the lubricant in respect of the ball rolling face 11 of the track rail 1 differs in accordance with a change in the inner diameter of the supply hole 76 opened in the oil amount adjusting plate 63. Further, the test has been carried out by preparing three test pieces for each of the inner diameters of the supply hole 76. A result thereof is shown in FIG. 11.

As is apparent from these graphs, it has been found that the larger the inner diameter of the supply hole 76 opened in the oil amount adjusting plate 63, the larger the inclination of the graph and the more increased is the lubricant coated from the lubricant supplying member 6 onto the rotating circular disk 82. The reason seems to be that the larger the inner diameter of the supply hole 76, the more increased is the contact area between the lubricant coater 61 and the lubricant absorber 62, the amount of the lubricant moving from the lubricant absorber 62 to the lubricant coater 61 is increased and more lubricant is impregnated by the lubricant coater 61.

Accordingly, it is preferable in view of stably coating a small amount of lubricant to the ball rolling face 11 of the track rail 1 over a long period of time to determine that the number of the supply hole 76 opened in the oil amount adjusting plate 63 is set to 1 for each of the lubricant coaters 61 and determine the inner diameter in accordance with the amount of lubricant which is necessitated in accordance with use of a bearing for linear sliding or the like.

Further, when the inventors has measured the delivery amount of lubricant by changing the attitude of the lubricant supplying member 6 in respect to the rotating circular disk 82, even in the case where the number and the inner diameter of the supply hole opened in the oil amount adjusting plate 63 remains the same, the amount of lubricant delivered from the respective lubricant supplying member 6 onto the rotating circular disk 12 has differed. The reason seems to be that when the attitude of using the lubricant supplying member 6 is changed, the amount of lubricant disposed upward from the supply hole 76 of the oil amount adjusting plate 63 in the lubricant impregnated to the lubricant absorber 62 is changed and the amount of the lubricant moving from the lubricant absorber 62 to the lubricant coater 61 is changed by influence of gravity.

Accordingly, it is preferable that the supply hole 76 is opened in the oil amount adjusting plate 63 in coincidence with the gravity center of the lubricant absorber 62 and according to such a constitution, regardless of the attitude of using the lubricant supplying member 6, the amount of lubricant moving from the lubricant absorber 62 to the lubricant coater 61 by influence of gravity can be made substantially constant.

Figure 12:
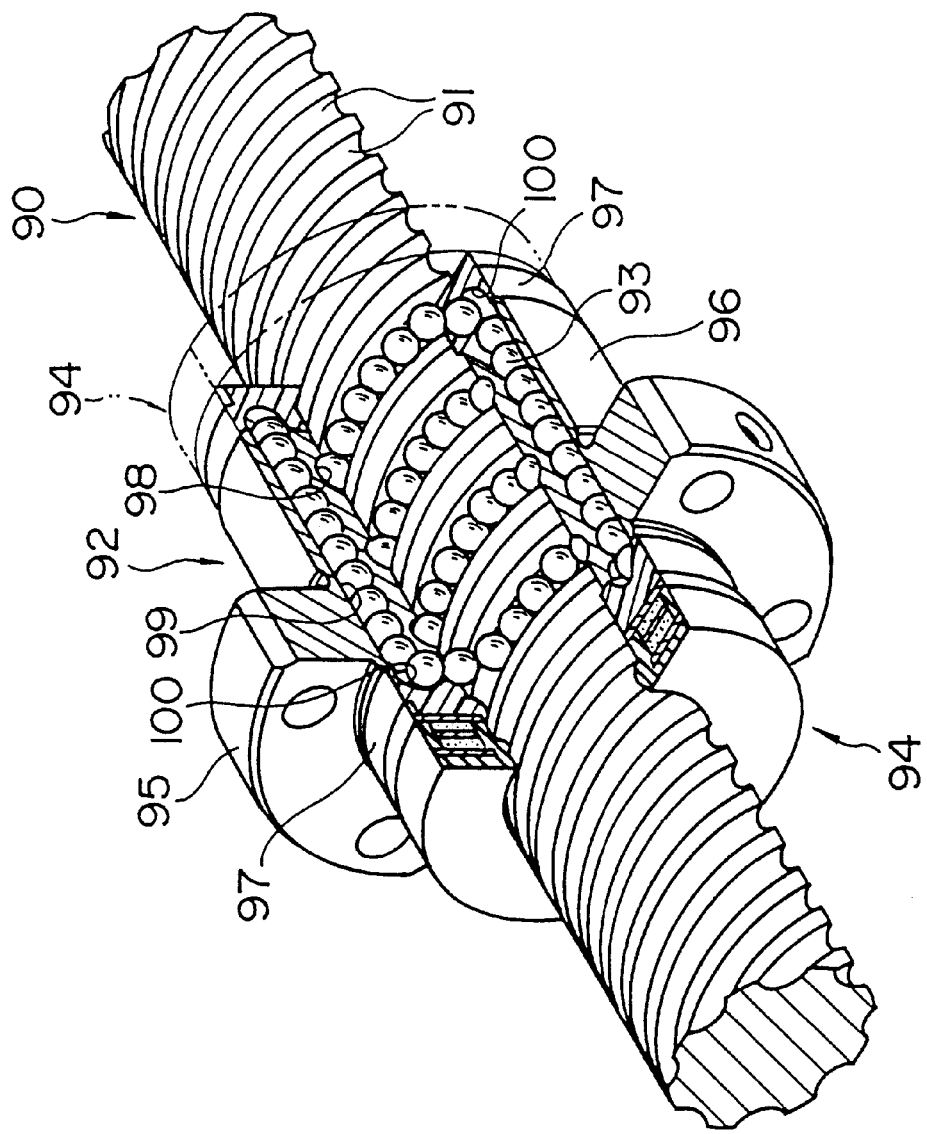
FIG. 12 is a partially cut perspective view showing an embodiment in which the present invention is applied to a ball screw.
Figure 13:
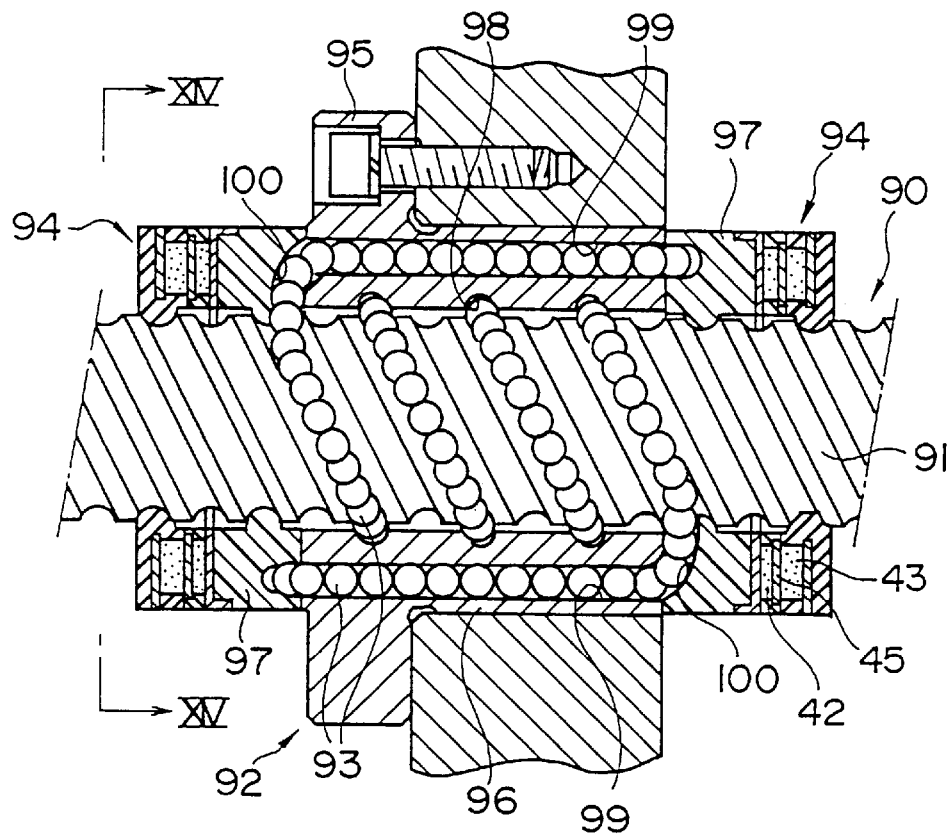
FIG. 13 is a sectional view showing a state of using the ball screw shown in FIG. 12.
Figure 14:
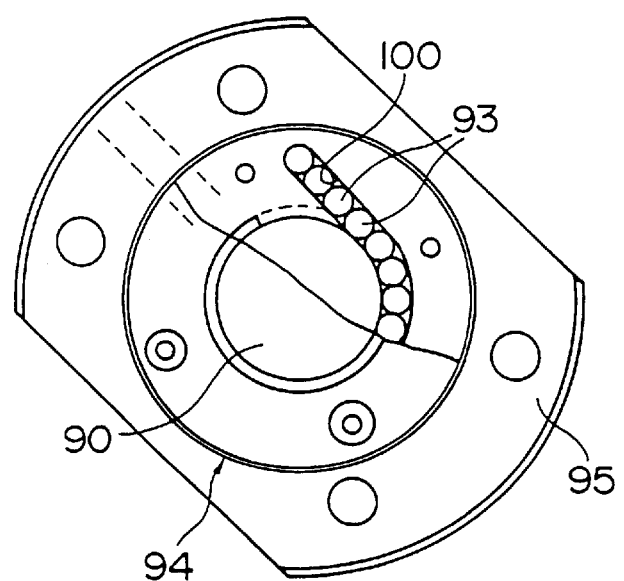
FIG. 14 is a view viewing the ball screw from a line XIV—XIV in FIG. 13.

FIG. 12 through FIG. 14 show an embodiment where the present invention is applied to a ball screw.

In the drawings, notation 90 designates a screw shaft (track shaft) on which a ball rolling groove 91 in a spiral shape is formed with a predetermined lead, notation 92 designates a nut member (slide member) having infinite tracks for circulating balls 93 and screwed to the screw shaft 90 via the balls 93, and notation 94 designates lubricant supplying members mounted to both of front and rear end faces of the nut member 92. Further, the lubricant coater 42, the lubricant absorber 43 and the oil amount adjusting plate (oil amount controlling means) 45 provided to the lubricant supplying member 94 are the same as those in the first embodiment mentioned above and accordingly, the same reference notations are attached thereto in the drawings and an explanation thereof will be omitted.

Here, the nut member 92 is constituted by a nut main body 96 made of steel projected with a flange portion 95 for fixing the nut member 92 and a pair of lids 97 made of synthetic resin fixed on both of the front and rear end faces of the nut main body 96.

While a load rolling groove 98 in a spiral shape opposed to the ball rolling groove 91 of the screw shaft 90 is formed on the inner diameter side, a ball return hole 99 in parallel with the screw shaft 90 is perforated. Further, the lid 97 is formed with direction change paths 100 for guiding the balls 93 which have finished rolling on the load rolling groove 98 of the nut main body 96 to ends on one side of the ball return holes 99 and on the other hand, guiding the balls 93 from ends on the other side of the ball return hole 99 to the load rolling groove 98 and the infinite tracks of the balls 93 are completed by fixing the lids 97 to the nut main body 96.

Further, although the lubricant supplying member 94 is formed in a ring-like shape in compliance with the shape of the nut member 92, the point where the lubricant coater, the oil amount adjusting plate and the lubricant absorber are incorporated in the casing is similar to that in the lubricant supplying members 4 and 6 mounted to the above-described linear guiding device and a detailed explanation thereof will be omitted here.

Further, according to the ball screw device of the embodiment constituted as mentioned above, when the screw shaft 90 and the nut member 92 are rotated relative to each other, the balls 93 roll on the load rolling groove 98 of the nut member 92 and the ball rolling groove 91 of the screw shaft 90 and the nut member 92 is moved in the axial direction of the screw shaft 90 while revoluting around the screw shaft 90. In this case, the lubricant is coated from the lubricant supplying member 94 onto the ball rolling groove 91 of the screw shaft 90 in accordance with the movement of the nut member 92 and lubrication of the ball rolling groove 91 and the balls 93 rolling thereon is carried out similar to the above-described embodiments.

Figure 15:
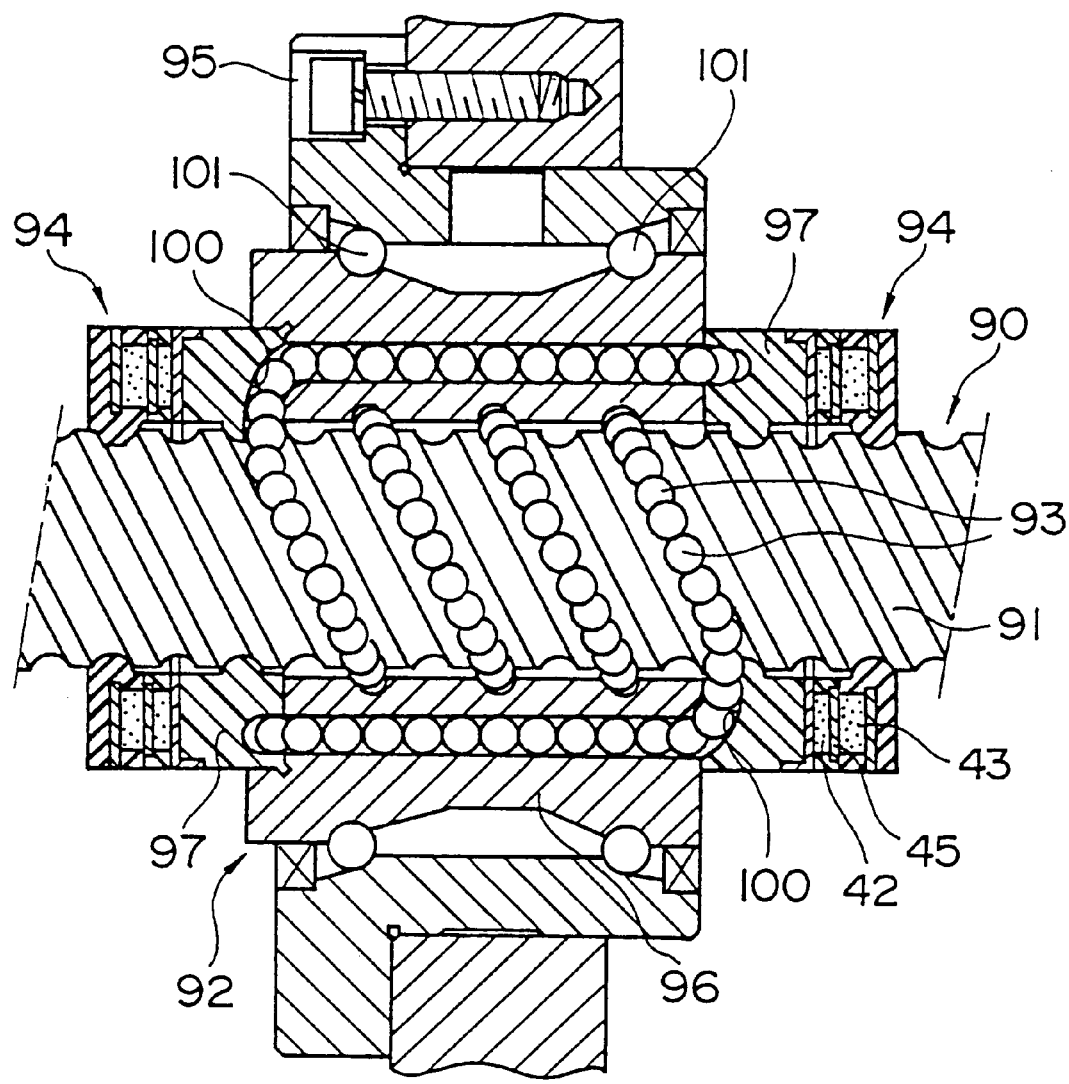
FIG. 15 is a longitudinal sectional view showing other embodiment in which the present invention is applied to a ball screw.

Further, the ball screw shown in FIG. 12 through FIG. 14 is of a type where the nut member 92 is fixed to a machine device of a table or the like by the flange portion 95 and which is used by rotating the screw shaft 90 by a motor, the ball screw to which the present invention is applicable is not limited thereto but, for example, as shown in FIG. 15, it may be of a type in which the nut member 92 is supported rotatably by a fixed unit of a table of the like via a pair of angular contact bearings 101 and which is used by rotating it in respect of the nut member 92 by a motor (not illustrated).

Figure 16:
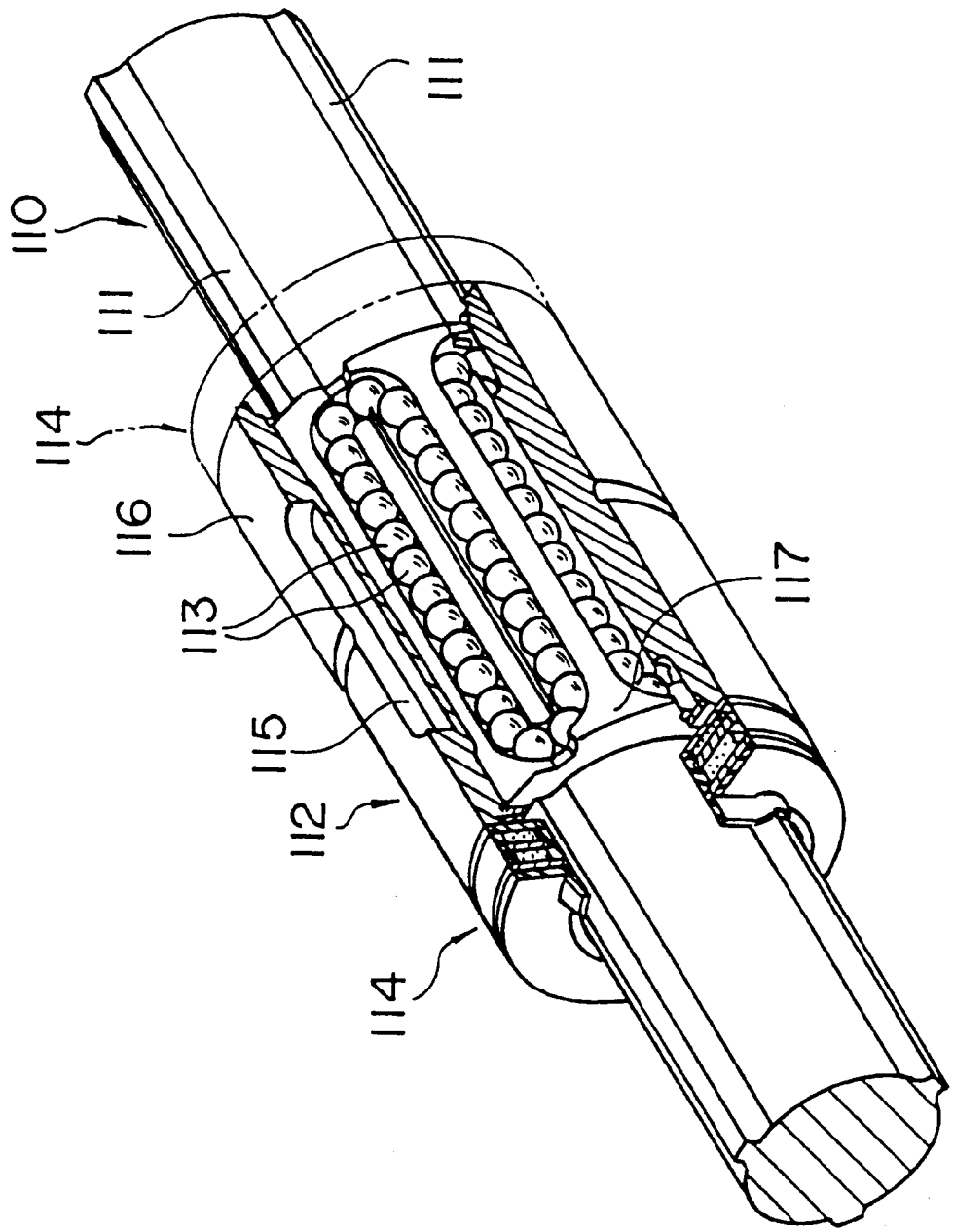
FIG. 16 is a partially cut perspective view showing an embodiment in which the present invention is applied to a ball spline.
Figure 17:
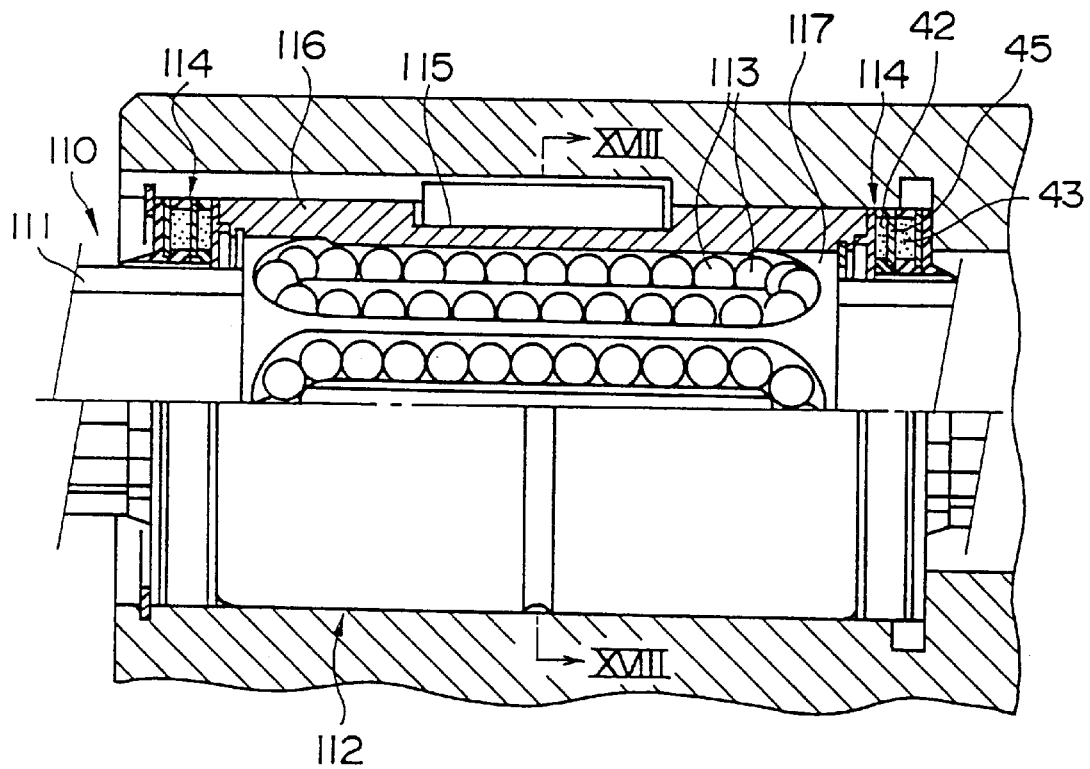
FIG. 17 is a sectional view showing a state of using the ball spline shown in FIG. 16.
Figure 18:
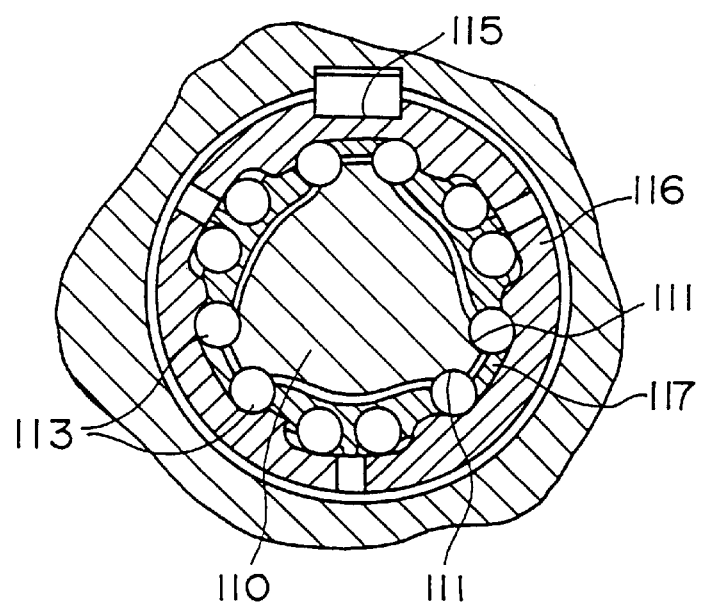
FIG. 18 is a sectional view taken along a line XVIII—XVIII of FIG. 17.
Figure 19:
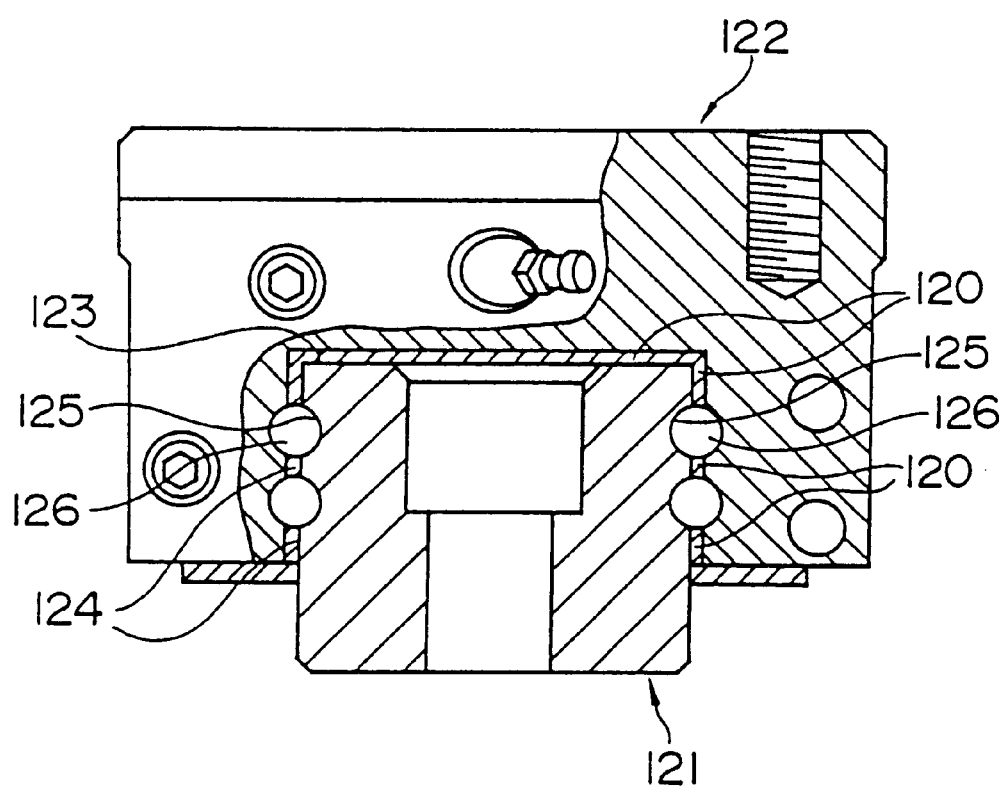
FIG. 19 is a partially cut sectional view showing an example of a conventional linear movement device.
Figure 20A:
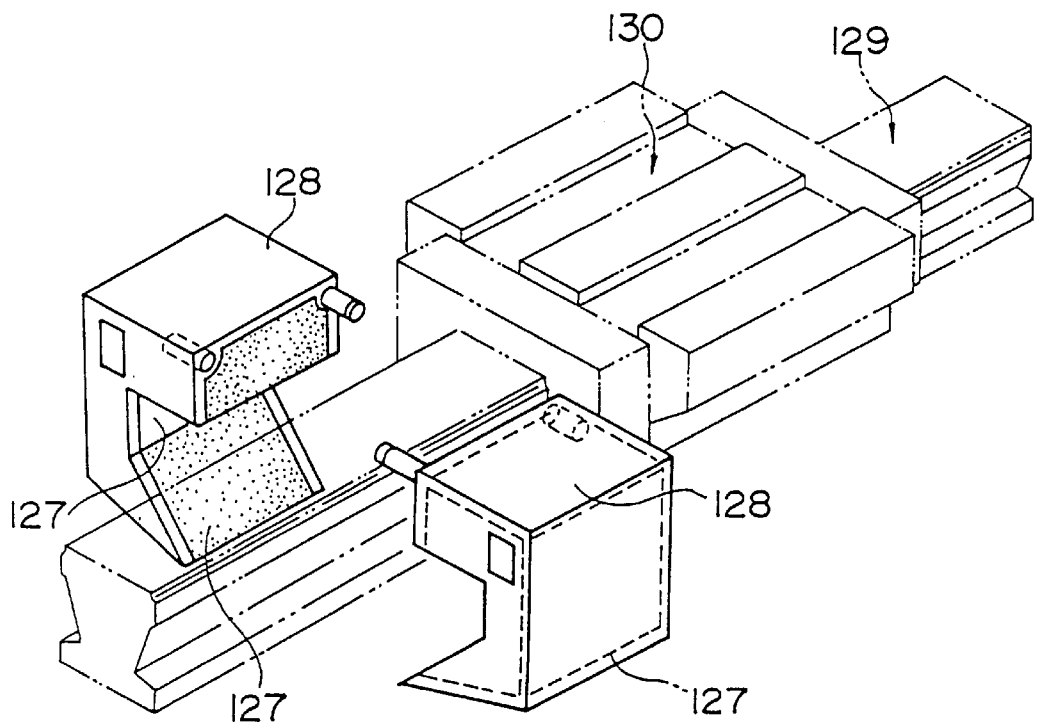
FIGS. 20(a) and 20(b) are a disassembled perspective view and a sectional view showing other example of a conventional linear movement device.
Figure 20B:
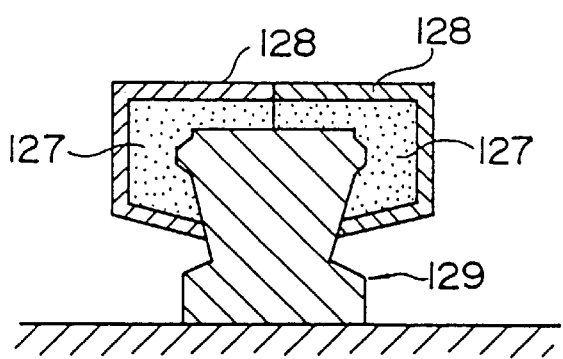

Next, FIG. 16 through FIG. 18 show an embodiment in which the present invention is applied to a ball spline.

In the drawings, notation 110 designates a spline shaft (track shaft) where ball rolling grooves 111 are formed along the axial direction, notation 112 designates a nut member (slide member) having infinite tracks for circulating balls 113 and fitted to the spline shaft 110 via the balls 113 and notation 114 designates lubricant supplying members mounted to both of front and rear end faces of nut member 112.

In this case, the nut member 112 is constituted by a nut main body 116 made of steel where a key groove 115 for fixing the nut member 112 is formed on the outer peripheral face and ball retainers 117 made of synthetic resin for forming the infinite circulation paths of the balls 113 by being fitted to the inner diameter of the nut main body 116. Further, although the lubricant supplying member 114 is formed in a ring-like shape in compliance with the shape of the nut member 112, the point where the lubricant coater, the oil amount adjusting plate and the lubricant absorber are incorporated in the casing is the same as that of the lubricant supplying members 4 and 6 mounted to a bearing for linear sliding and a detailed explanation thereof will be omitted here.

Further, according to the ball spline of the embodiment constituted as described above, when the nut member 112 is moved along the spline shaft 110, the lubricant is coated from the lubricant supplying members 114 mounted to the nut member 112 onto the ball rolling grooves 111 of the spline shaft 110 and lubrication of the ball rolling grooves 111 and the balls 113 rolling thereon is carried out similar to the above-described embodiments.

INDUSTRIAL APPLICABILITY

As has been explained, according to the linear movement device of the present invention, the lubricant supplying member is provided with the lubricant coater for coating lubricant to the track shaft and the lubricant absorber for supplying the lubricant to the lubricant coater and is further provided with the oil amount controlling means for controlling the amount of the lubricant supplied from the lubricant absorber to the lubricant coater and accordingly, even when the accumulated running distance of the guide member in respect of the track shaft is increased in accordance with elapse of time, a stable amount of the lubricant is always impregnated to the lubricant coater supplied with the lubricant from the lubricant absorber, a constant amount of the lubricant is always coated from the lubricant coater onto the track shaft and accordingly, an amount of the lubricant which is a necessary minimum in lubricating the rolling face of the rolling element or the rolling element can be coated on the track shaft stably over a long period of time.

Further, the necessary minimum amount of the lubricant can stably be coated and therefore, the face of the track shaft for rolling the rolling element can be lubricated by a small amount of the lubricant over a long period of time and the lubricant absorber can be downsized by that amount and a compact linear movement device can be designed.

What is claimed is:

1. A linear movement device comprising a track shaft where a rolling face of a rolling element is formed, a slide member engaged with the track shaft via the rolling element and moved relative to the track shaft and a lubricant supplying member mounted to the slide member and coating a lubricant on a surface of the track shaft in accordance with the relative movement:

wherein the lubricant supplying member comprises a lubricant coater brought into contact with the track shaft for coating the lubricant on the track shaft, a lubricant absorber installed contiguous to the lubricant coater for supplying the lubricant to the lubricant coater while absorbing the lubricant and holding the lubricant and oil amount controlling means for controlling an amount of the lubricant supplied from the lubricant absorber to the lubricant coater.

2. The linear movement device according to claim 1, wherein the lubricant supplying member comprises a casing mounted to the sliding member and the lubricant coater and the lubricant absorber are incorporated in the casing.

3. The linear movement device according to claim 2, wherein the casing comprises a seal lip portion brought into close contact with the surface of the track shaft.

4. The linear movement device according to claim 2 or claim 3, wherein the casing is formed by a soft elastic body.

5. The linear movement device according to claim 1 or 2, wherein the oil amount controlling means is constituted by changing a material of the lubricant absorber from a material of the lubricant coater.

6. The linear movement device according to claim 1 or 2, wherein the oil amount controlling means is an oil amount adjusting film which separates the lubricant absorber from the lubricant coater and permeates the lubricant from a side of the lubricant absorber to a side of the lubricant coater.

7. The linear movement device according to claim 1 or claim 2, wherein the supply amount controlling means is an oil amount adjusting film which separates the lubricant absorber from the lubricant coater and in which a supply hole of the lubricant is opened.

8. The linear movement device according to claim 7, wherein an inner diameter and/or a number of the supply holes opened in the oil amount adjusting plate is adjusted in accordance with an amount of lubricant to be coated on the track shaft.

9. A lubricant supplying device mounted to a slide member engaged with a track shaft via a rolling element for coating a lubricant to the track shaft in accordance with a relative movement between the slide member and the track shaft:

wherein the lubricant supplying device comprises a lubricant coater brought into contact with the track shaft for coating the lubricant to the track shaft, a lubricant absorber installed contiguous to the lubricant coater for supplying the lubricant to the lubricant coater while absorbing the lubricant and holding the lubricant and oil amount controlling means for controlling an amount of the lubricant supplied from the lubricant absorber to the lubricant coater.

10. The lubricant supplying device according to claim 9, wherein the lubricant coater and the lubricant absorber are incorporated in a casing and mounted to the slide member via the casing.

* * * * *